Sept. 30, 1969     D. N. WHITE     3,469,356
EXPANDABLE HOUSE TRAILER
Filed March 11, 1968     2 Sheets-Sheet 1
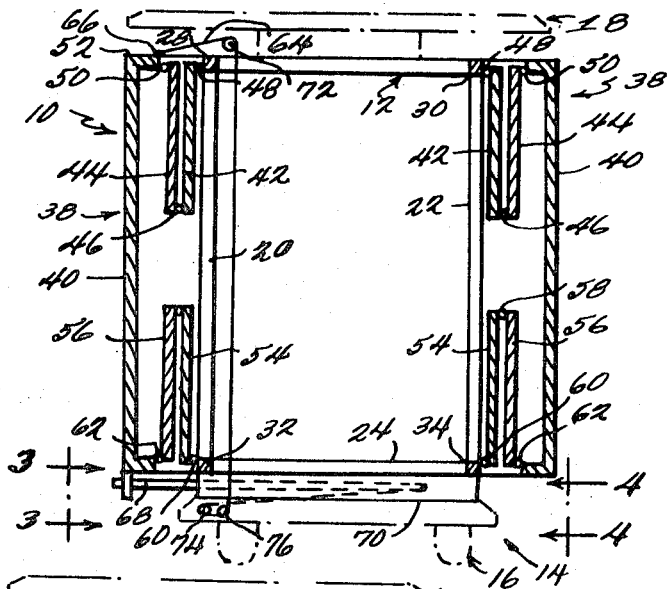
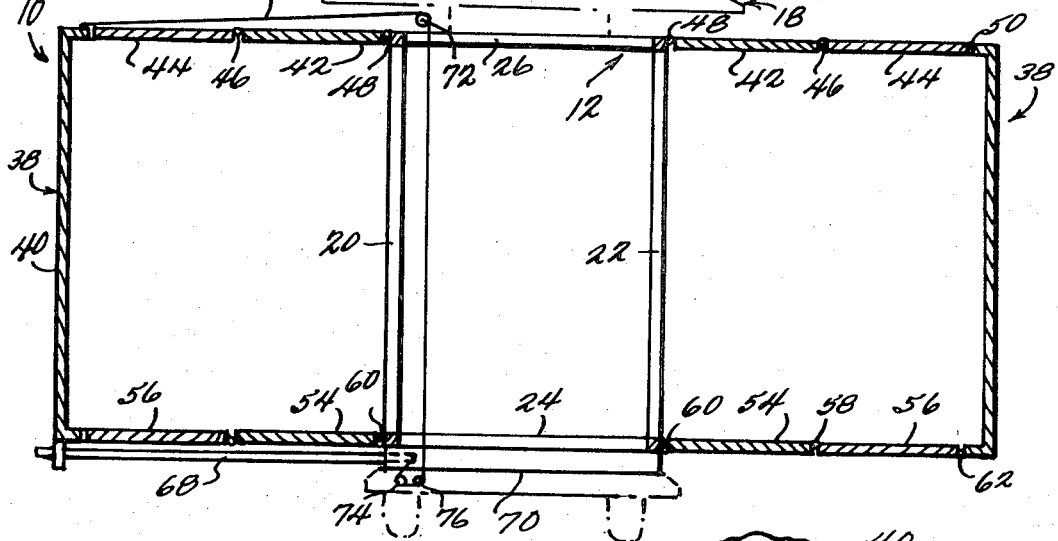
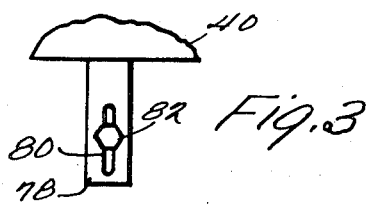
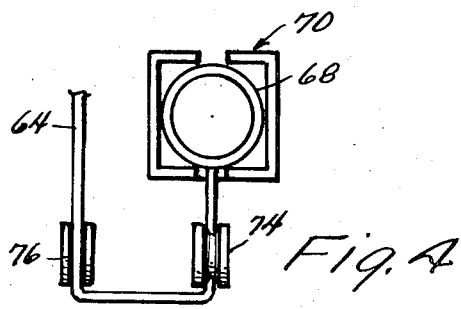
INVENTOR
DARRELL N. WHITE
BY Cushman, Darby & Cushman
ATTORNEYS

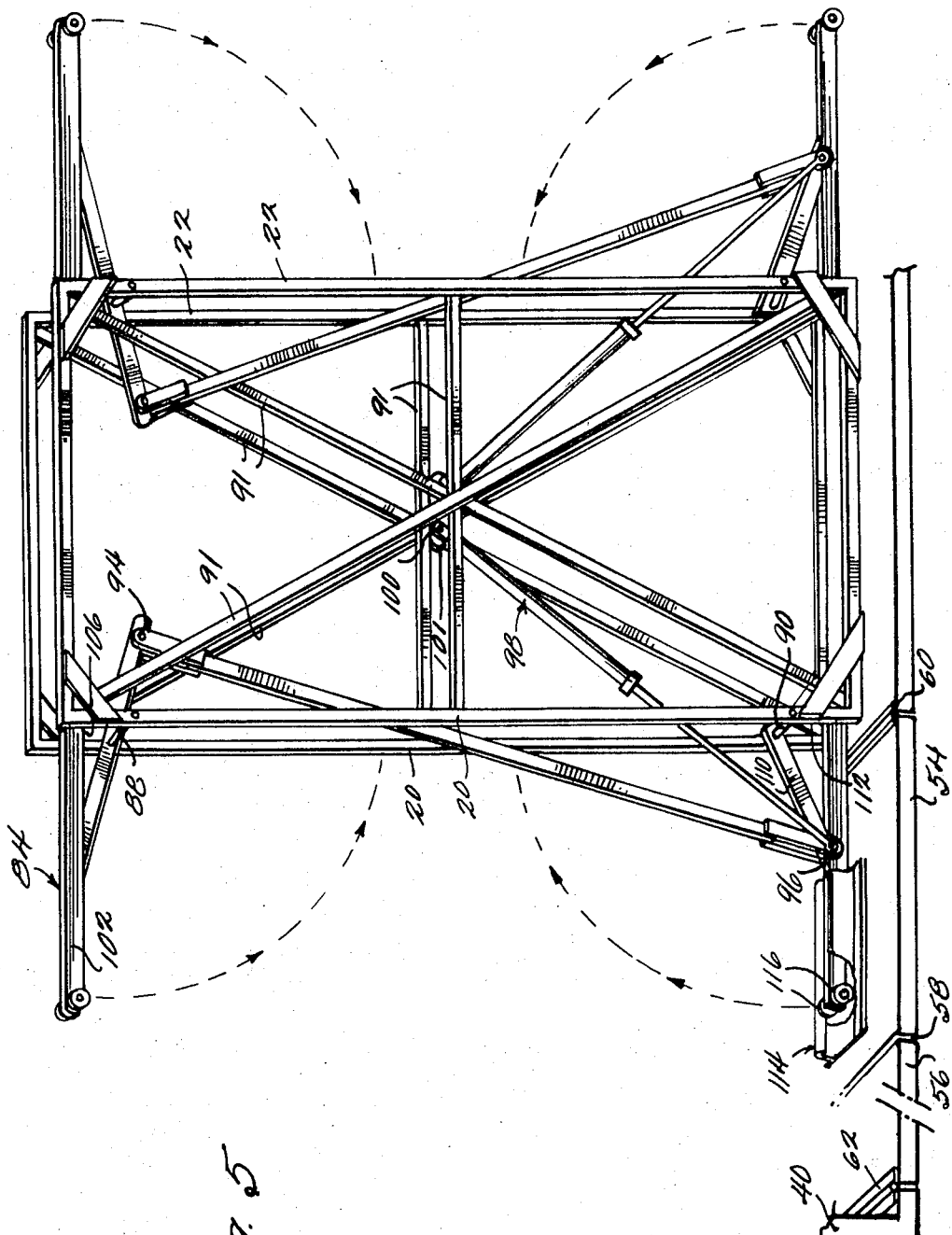

United States Patent Office 3,469,356
Patented Sept. 30, 1969

3,469,356
EXPANDABLE HOUSE TRAILER
Darrell N. White, Dalhart, Tex., assignor of one-half to Bruce Henderson, Amarillo, Tex.
Filed Mar. 11, 1968, Ser. No. 711,982
Int. Cl. E04b 1/344; B60p 3/34
U.S. Cl. 52—71                                    4 Claims

ABSTRACT OF THE DISCLOSURE

A laterally-expandable house trailer includes permanently vertical opposite side walls connected to a central trailer body by pivoted roof and floor panels which fold and unfold accordion-like as the side walls move inwardly and outwardly. A mechanical linkage powered by hydraulic rams and carried within the central body acts on the innermost roof and floor panels to effect retraction and expansion.

Disclosure

This invention relates to expandable building structures and in particular to an expandable-retractable building structure which is primarily adapted to be mounted upon wheels for movement from place to place. The expandable-retractable structure may be a mobile home, office, school unit, factory unit or the like and it may be a towed trailer or a self-propelled vehicle.

It is known, broadly, to provide a building structure which is laterally expandable from a transport or retracted width suitable for moving along a highway to an expanded or stationary width which is substantially greater than the transport width. The advantage of this type of structure is, of course, to provide a building structure of greater capacity without exceeding the width and length restrictions for vehicles using public roadways and other public facilities. The present invention is concerned with this general type of building structure and is characterized in having a novel arrangement of hinged roof, floor and wall panels and a novel arrangement of an operating linkage for effecting expansion and retraction.

More particularly, the present invention is concerned with a structure having permanently upright side walls and an accordion-like arrangement between pivoted roof panels and between pivoted floor panels such that in the retracted position the pivoted roof and floor fold into vertical positions within the perimeter defined by the side walls and a central body portion. The operating linkage for the panels may take different forms but is characterized in being of compact size and having at least one operating arm pivoted at one end to the central body for movement in a vertical plane and having an outer end slidably cooperating with a pivoted floor or roof panel to swing the latter between expanded and retracted positions. Conveniently, the drive element for moving the operating arm is a hydraulic ram, and hydraulic pressure may be generated either by a motor-driven pump or a hand pump. The system also includes a mechanical stabilizing connection between the various moving parts for assuring that the parts move smoothly and properly.

The invention will be further understood from the following detailed description of an exemplary embodiment taken with the drawings in which:

FIGURE 1 is a schematic transverse sectional view through a trailer embodying the principles of the present invention;

FIGURE 2 is a view similar to FIGURE 1 showing the trailer in an expanded position;

FIGURES 3 and 4 are fragmentary views, looking in the direction of the arrows 3—3 and 4—4, respectively, in FIGURE 1; and FIGURE 5 is a perspective view of an operating linkage for effecting expansion and retraction of the trailer illustrated in FIGURES 1 and 2.

Referring to FIGURE 1 there is shown schematically in transverse section a house trailer 10 embodying the principles of the present invention having a central body 12 of approximately normal transport width, an undercarriage 14 supporting the central body 12 and ground-engaging wheels 16 disposed below the undercarriage 14. The undercarriage and wheel arrangement may be of conventional construction and require no detailed description. A roof 18, which also may be of conventional construction, overlies the body 12.

The body 12 may be of any suitable construction having the required strength and rigidity and is shown in simplified form as including a plurality of elongated support members, such as channel members, which are connected together in the form of an open box-like framework for the purpose of providing support for the usual walls, floor and ceiling, the latter structures being omitted in the interest of simplicity of illustration. As shown, the support members include sets of upright side members 20 and 22 connected at their ends to the ends of transverse floor members 24 and to the ends of transverse ceiling members 26. Horizontal elongated support members 28, 30 and 32, 34 extend longitudinally of the trailer between spaced-apart sets of the other support members.

According to one feature of the present invention the body of the expandable building structure, the central wheel-supported trailer body 12 in the illustrated embodiment, is provided with two oppositely disposed, laterally expandable wall assemblies 38 each of which includes a permanently upright side wall 40 and folding roof panels and floor panels connected so as to move accordion-like when the structure is expanded or retracted. As shown, each assembly 38 includes an inner roof panel 42 and an outer roof panel 44 pivotally connected together along their opposed edges by a suitable hinge 46 which permits the panels to assume vertical positions as shown in FIGURE 1. The inner edge of the inner roof panel 42 is pivotally connected to the frame of the central body 12 by a hinge 48, and the outer edge of the outer roof panel 44 is pivotally connected to the upper edge of the respective side wall 40 by a hinge 50. The side wall 40 includes an inwardly directed horizontal flange 52 to provide a suitable support surface for the hinge 50. An inner floor panel 54 and an outer floor panel 56 are pivotally connected to each other and to the frame and side wall in an opposite manner by means of hinges 58, 60 and 62 so that folding or unfolding of the panels is accompanied by simultaneous horizontal movement of the side wall 40. It will be understood that the side walls 40 will be provided with door and window openings where desired.

As an aid in stabilizing the expandable wall assembly 38 and synchronizing the movements of the panels and side wall 40 there is provided a mechanical connection between the upper and lower portions of the side wall 40 for equalizing the push or pull forces at these locations. As shown in FIGURES 1 and 2 the connection includes a flexible tensioned cable 64 secured at one of its ends to the upper edge of the side wall 40, as at 66, and at its other end to a horizontal transverse bar 68 which is slidable within a fixed carrier member 70 secured to the lower surface of the frame. The cable 64 passes over a pulley 72 mounted on the upper part of the frame, then downwardly around two spaced-apart pulleys 74 and 76 on the lower part of the frame and then inwardly to the inner end of the slide bar 68. The outer end of the slide bar 68 is connected to the lower edge of the side wall 40 in any suitable manner. As shown in FIGURE 3, connection is effected by a bracket plate 78 depending from the side wall 40 and having a slot 80 therein which permits a bolt 82 to be threaded into the outer end of the slide bar 68. As shown in FIGURE 4, the carrier 70 may be constructed of opposed channel members the flange portions of which enclose the slide bar and permit the cable to pass freely to the end of the slide bar.

In operation, the slide bar arrangement maintains the side wall 40 in a vertical position because the tensioned cable 64 resists any displacement of one edge of the side wall 40 relative to the other edge. For example, if the top edge tends to tilt outwardly, tension in the cable 64 increases, and the pulley arrangement is such that this tends to force the slide bar 68 outwardly, thereby restoring the vertical position of the side wall 40. In addition, tension in the cable 64 continually exerts a pull on the upper and lower edges of the side wall 40 so that there is a minimum of play between the various hinged parts and so that the parts will move simultaneously when an expansion or retraction force is applied to any one of the parts. A similar slide bar arrangement (not shown) is provided for the opposite wall assembly 38.

Referring now to FIGURE 5, there is shown an embodiment of one form of actuating mechanism for the expandable and retractable wall assemblies 38 of FIGURE 1. The mechanism lies in a vertical plane extending transversely across the trailer body 12, and preferably it is disposed at about the midpoint of the body 12, although it may be disposed at or near one end. While the mechanism is illustrated in twin form capable of actuating both wall assemblies, it will be understood that the principles apply equally well to the actuation of a single wall assembly. Considering first only the left wall assembly it will be seen that the actuating mechanism includes an upper operating arm 84 and a lower operating arm 86 each of which is pivoted for swinging movement in a common vertical plane. The arms are shown as being pivoted by pins 88 and 90, respectively, to two of the spaced apart vertical support members 20 illustrated in FIGURES 1 and 2, but it will be understood that the supporting members for the mechanism need not necessarily be the same as the members which make up the body 12 of the trailer. Additional bracing members 91 may be employed if desired.

The upper and lower operating arms 84 and 86 are connected for simultaneous movement by a stabilizing arm 92 which is pinned to the upper operating arm 84 at 94 and to the lower operating arm 86 at 96. Swinging movement is imparted to the operating arms by a hydraulic ram 98 which is pivoted at one end to the pin 96 and at its other end to a pin 100 carried by a bracket 101 secured to the bracing members 91 at a location inwardly of the support members 20. Fluid pressure supply means (not shown) for the ram 98 may take the form of a motor-driven pump or a hand pump.

Referring more specifically to the construction of the upper operating arm 84, it will be seen that the arm is formed of three members 102, 104, 106 rigidly connected together as by welding. The member 104 extends from about the midpoint of the member 102, and at an acute angle with respect thereto, to a location inwardly of the support members 20, and the member 106 serves as a brace between the members 102 and 104. The pivot pin 88 for the entire arm 84 extends horizontally through the arm member 104, at about the midpoint of the latter, in a direction parallel to the longitudinal axis of the trailer, and the stabilizing arm pin 94 is disposed at or near the inner end of the arm member 104.

The lower operating arm 86 is constructed of three members 108, 110, 112 rigidly connected together. The arm member 110 extends at an acute angle from about the midpoint of the arm member 108 to the location of the supports 20 where it is pivoted on the pin 90. The stabilizing arm pin 96 is located at about the midpoint of the arm member 108.

The outer ends of the operating arms 84 and 86 cooperate with the respective roof and floor panels 42 and 54 to transmit swinging movement to the latter. As shown in FIGURE 5 this may be accomplished by means of a roller and shoe arrangement which permits push and pull forces to be applied to the panels without generating appreciable frictional drag. The arrangement is fully illustrated for the lower operating arm 86, and it will be understood that a corresponding arrangement is employed with the upper arm 84. As shown, the outer end portion of the arm 86 telescopically projects into a shoe 114 which is rigidly secured to the upper surface of the floor panel 54. A roller 116 is journalled to each side of the arm 86, and the running surfaces of the rollers engage parallel, spaced-apart upper and lower rail surfaces defined by the shoe 114. The rail surfaces may be formed by any suitable structure and, as shown, they are formed by the flanges of two channel members which prevent the rollers 116 from rising out of the shoe 114.

The expandable-retractable wall assembly on the right side of the trailer 10 of FIGURE 1 is actuated by an identical mechanism, the latter being illustrated in FIGURE 5.

The operation of either of the actuating mechanisms and the resulting motion of the movable trailer parts is apparent from the drawings and from the above description and need be only briefly reviewed. Referring to FIGURES 2 and 5 it will be seen that the trailer is in an expanded position, this having been effected by extending the ram 98 to swing the upper and lower operating arms 84 and 86 into horizontal mutually parallel positions. To retract the wall assembly 38, the ram 98 is retracted so as to apply a clockwise rotation to the lower operating arm 86, as illustrated by the arrows. Simultaneously a counterclockwise rotation is applied to the upper operating arm 84 by the stabilizing arm 92, the rotation being equal due to the relative positions of the pivot points 88, 90, 94 and 96.

The free ends of the arms 84 and 86 transmit pulling forces to the respective roof and floor panels 42 and 54, and the latter begin to fold inwardly toward the positions shown in FIGURE 1. Due to the different location of each panel hinge and the pivot pin for the respective arm, there is relative movement between each panel and its arm, and this movement results in movement of the rollers 116 along the rail surfaces of the respective shoe 114.

The slide bar arrangement shown in FIGURES 1 and 2 assures that all the panels and the side wall 40 of the movable wall assembly 38 move together. The slide bar 68 will move into the fixed carrier 70 as the lower portion of the side wall 40 moves to the right, and the upper portion of the wall 40 moves simultaneously to the same extent due to the tensioned cable 64 which has substantially the same effect as a rigid connection between upper and lower portions of the side wall 40.

Continued retraction of the ram 98 brings the parts into the fully retracted position shown in FIGURE 1, and it will be apparent that extension of the ram 98 will reverse the movement of the parts to effect expansion of the trailer.

The arrangement of a pivoted operating arm with an inner roof panel and an inner floor panel is an important feature of the present invention because it contributes to a compact actuating mechanism particularly in that a relatively short ram may be employed. However, this advantage may be achieved with various different linkages between the ram and the operating arms and it does not depend on the particular arrangement of the ram 98 and the other linkage parts illustrated in FIGURE 5. For example, the ram 98 may be connected to apply forces to the stabilizing arm 92 or to some other element which forms part of the connection between the moving members. Also, the connection may extend from an upper operating arm to a lower operating arm on the opposite side of the body 12.

Accordingly, the above-described embodiment is exemplary of the principles of the invention and the details are not intended to be limiting except as they appear in the appended claims.

What is claimed is:

1. In an expandable-retractable building structure having a fixed roof section and a fixed floor section, a roof panel pivoted to an edge of the roof section for swinging movement in a vertical plane between an expanded generally horizontal position, a collapsed generally vertical position and a floor panel pivoted to an edge of the floor section for swinging movement in a vertical plane between an expanded generally horizontal position and a collapsed, generally vertical position and means for swinging said panels between said expanded and collapsed positions, the improvement in said means which comprises: an upper operating arm associated with said roof panel, said arm being pivoted for swinging movement in a vertical plane about a fixed axis and having a free outer end cooperating with the lower surface of said roof panel and movable relative thereto to cause said roof panel to swing in unison with the arm; a lower operating arm associated with said floor panel, said lower arm being pivoted for swinging movement in a vertical plane about a fixed axis and having a free outer end cooperating with the upper surface of said floor panel to cause said floor panel to swing in unison with the lower arm; means interconnecting said arms for distributing swinging forces among the arms in a mode to swing the arms together toward an expanded or collapsed position, said arms and said interconnecting means defining an actuating assembly for said panels; and extensible-retractable power means for swinging said arms, said power means cooperating with said actuating assembly for applying forces thereto which are transmitted by said assembly to said arms as swinging forces.

2. Apparatus as in claim 1 including rollers disposed between the free outer ends of said arms and the respective panels.

3. Apparatus as in claim 1 wherein said power means is a hydraulic ram having one end pivoted at a fixed position and its other end pivoted to said actuating assembly.

4. Apparatus as in claim 3 wherein said other end of said ram is pivoted to one of said arms and wherein said interconnecting means includes a rigid link member having one of its ends pivoted to one of the arms and its other end pivoted to said other arm.

References Cited

UNITED STATES PATENTS

| 2,167,557 | 7/1939  | Stout  | 52—69   |
|-----------|---------|--------|---------|
| 2,395,691 | 2/1946  | Smith  | 52—71 X |
| 2,886,856 | 5/1959  | Che    | 52—69   |
| 2,913,775 | 11/1959 | Sailor | 52—69   |
| 2,790,673 | 4/1957  | Nieden | 296—23  |

JOHN E. MURTAGH, Primary Examiner

U.S. Cl. X.R.

296—27